April 5, 1966 R. W. COMPO 3,244,254
COMBINATION EXHAUST CONDUIT AND MUFFLER
Filed Jan. 8, 1964 3 Sheets-Sheet 1
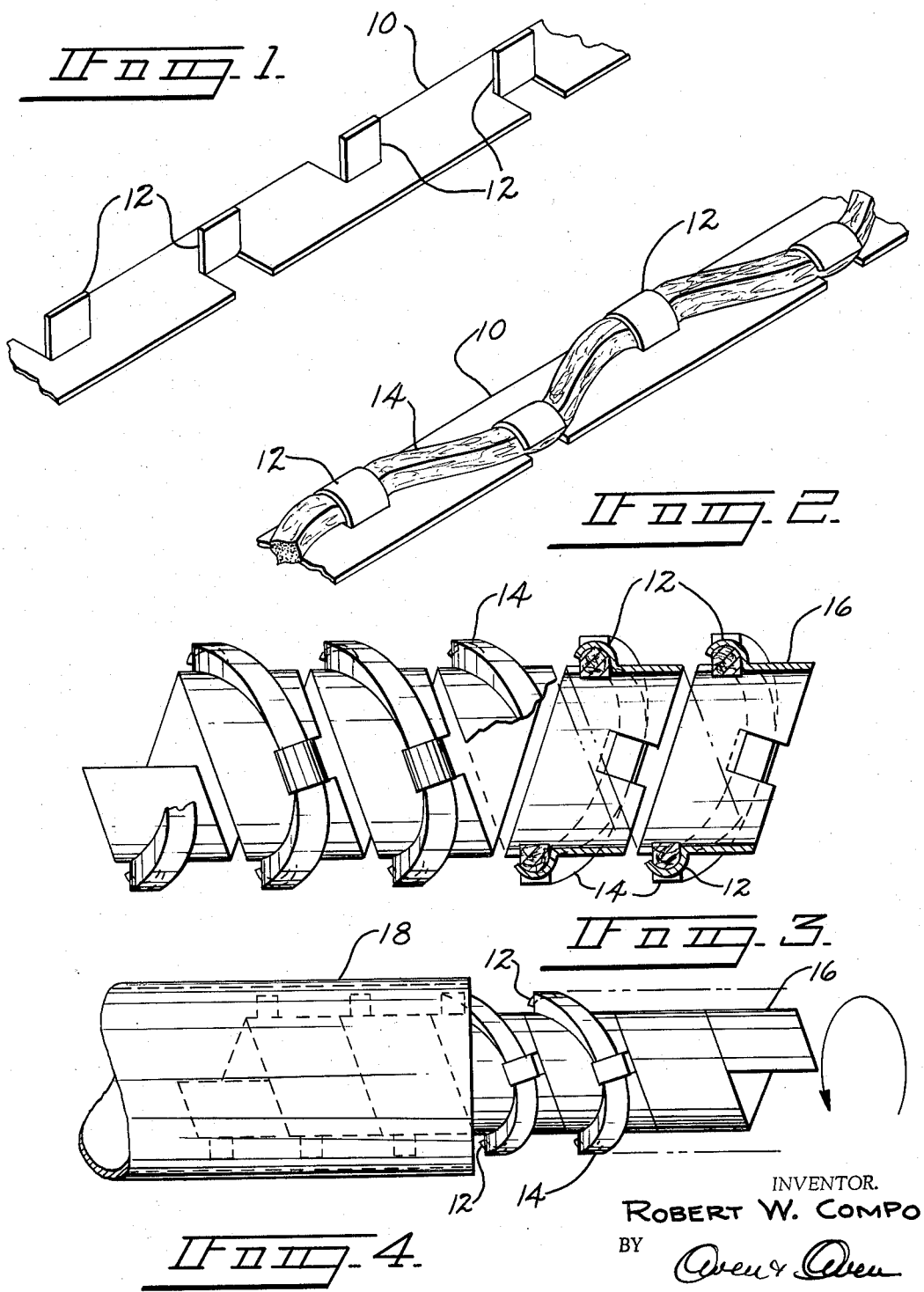
INVENTOR.
ROBERT W. COMPO
BY
ATTORNEYS April 5, 1966  R. W. COMPO  3,244,254
COMBINATION EXHAUST CONDUIT AND MUFFLER
Filed Jan. 8, 1964  3 Sheets-Sheet 2

INVENTOR.
ROBERT W. COMPO
BY Owen & Owen
ATTORNEYS

April 5, 1966   R. W. COMPO   3,244,254
COMBINATION EXHAUST CONDUIT AND MUFFLER
Filed Jan. 8, 1964   3 Sheets-Sheet 3

INVENTOR.
ROBERT W. COMPO
BY
*Owen & Owen*
ATTORNEYS

United States Patent Office 3,244,254
Patented Apr. 5, 1966

3,244,254
COMBINATION EXHAUST CONDUIT AND MUFFLER
Robert W. Compo, Defiance, Ohio, assignor to Compo Corporation, Defiance, Ohio, a corporation of Ohio
Filed Jan. 8, 1964, Ser. No. 336,503
7 Claims. (Cl. 181—42)

The present invention relates to conduits of generally uniform cross section for both conveying and attenuating noise levels in gases; and more particularly to a combination muffler and exhaust pipe for an automotive vehicle.

Most of the exhaust systems which have been made heretofore for automotive vehicles comprise a muffler in which exhaust gases are conducted from the engine by a conduit called an exhaust pipe. The muffler absorbs sounds from the exhaust gases and the gases are then conducted to a remote point of discharge by a conduit called a tail pipe. The mufflers have been tank like structures of but a few feet in length and have had a cross section many times greater than that of the exhaust and tail pipes. While it has been proposed heretofore to provide a combination muffler and exhaust pipe having a generally constant outside diameter, the designs that have been proposed have been very costly to produce. These prior art combination mufflers and exhaust pipes have had generally rigid internal sound absorbing structures installed inside of the exhaust conduits. In one design proposed heretofore the combination structure has utilized a flexible outer conduit and a generally planar inside baffle to support the outer conduit. This construction is not only expensive but causes the outer conduit to be subject to corrosion and leaks. In another combination structure which has been proposed, the inside sound absorbing structures have been rigid and are confined to the straight sections of the exhaust pipe, and these straight sections have been welded to bent sections of tubing to provide the desired configuration of exhaust conduit. This latter construction involves a large amount of butt welding of the conduit and is quite expensive to manufacture.

An object of the present invention is the provision of a new and improved gas conveying and silencing conduit that comprises sections of generally tubular conduit bent at one or more locations into a predetermined configuration and containing a flexible sound absorbing generally tubular structure which extends through substantially the full length of the tubular conduit including its curved portions.

Another object of the invention is the provision of a new and improved method of producing a conduit for conveying and silencing gases which comprises: providing a straight section of a self-supporting tubular member having an internal chamber of generally constant cross section, inserting a section of a flexible generally tubular structure inside of said tubular member, and bending said tubular member with said flexible internal tubular structure in place into a desired configuration of exhaust pipe.

Another object of the invention is the provision of a new and improved method of producing a conduit for conveying and silencing gases which comprises bending a self-supporting tubular member into a desired exhaust pipe configuration, providing a flexible generally tubular sound absorbing structure having a diameter which can be reduced and enlarged to some degree, inserting said flexible sound absorbing structure into said bent tubular member while said sound absorbing structure is in a reduced diameter condition, and expanding said flexible sound absorbing material after it is installed in said tubular member.

A still further object of the invention is the provision of a new and improved conduit for conveying and silencing gases comprising a self-supporting tubular outer member, a helically wound strip of metal inside said tubular member, and means spacing the helically wound strip from the outer tubular member.

A more particular object of the invention is the provision of a new and improved combination muffler and exhaust pipe comprising a self-supporting tubular outer member, a helically wound strip of metal inside said tubular member, and a high temperature resistant resilient sound absorbing material spacing said helically wound strip from the tubular outer member.

The invention resides in certain constructions, and combinations, and arrangements of parts; and further objects and advantages will become apparent to those skilled in the art to which the invention relates from the following description of several preferred embodiments described with reference to the accompanying drawings forming a part of this specification, and in which:

FIG. 1 of the drawings is a fragmentary view of a piece of strip metal having tabs which are bent upwardly from one of its surfaces;

FIG. 2 is a fragmentary view of an assembly fabricated from the strip of FIG. 1 showing a strip of high temprature resistant resilient material attached to the surface of the strip material by means of bent-over tabs;

FIG. 3 shows the strip material of FIG. 2 coiled into a helix of generally tubular configuration having the heat resistant resilient material on the outer surface of the helix, a section being broken away to better illustrate its construction;

FIG. 4 shows an end portion of the helix of FIG. 3 ready for installation in the end of a metal tube, and twisted to reduce the diameter of the helix;

Figure 9:
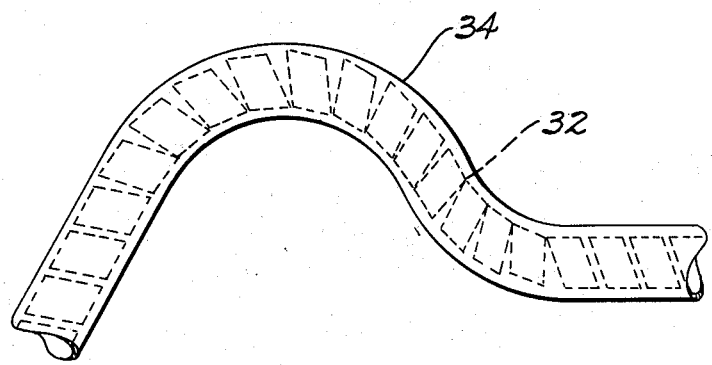
FIG. 9 illustrates a step in the production of a muffler which constitutes yet another embodiment of the invention, and shows a bent section of metal tubing in which a metal strip wound into a helix is being inserted.
Figure 10:
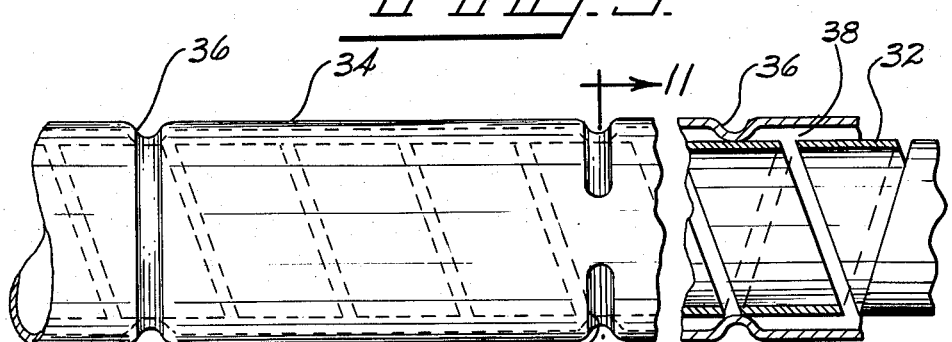
Figure 11:
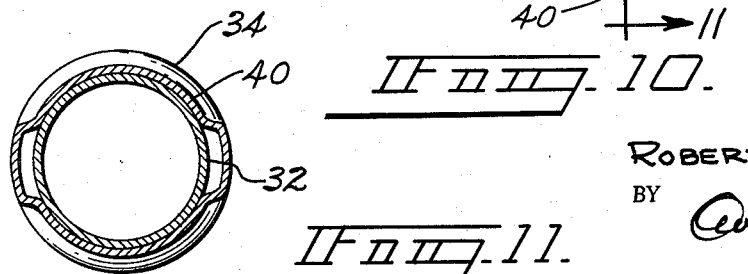

FIG. 10 is a fragmentary view of a section of the final muffler produced by a method which includes the step illustrated in FIG. 9, and in which the outer metal tube is deformed inwardly at spaced intervals to abut a helical member within the outer tube and provide air cushion compartments between the inwardly bent portions of the outer tube and to firmly secure the inner liner within the outer in any desired relationship with the outer tube; and FIG. 11 is a sectional view taken along the line 11—11 of FIG. 10.

FIGS. 1–6 of the drawings show the structure of one embodiment of a combination muffler and exhaust pipe of the invention and illustrate the method by means of which the muffler is formed. FIG. 1 of the drawings shows a piece 10 of impervious strip steel which is appropriately sheared at spaced apart intervals to provide a plurality of tabs 12 which are bent upwardly from one of its major surfaces. The strip 10 may be sheared so that the tabs are located approximately midway between the sides of the strip, but as shown in the drawing is preferably seared adjacent its side edges. The tabs 12 are preferably arranged as shown so that alternate tabs are longitudinally aligned, and adjacent tabs are located near the opposite sides of the strip 10. The purpose of the tabs 12 is to secure a strip of resilient material 14, such as fiberglass or woven asbestos, which is resistant to high temperatures to one major surface of the strip 10. The strip 10 with the resilient material 14 affixed thereto by the tabs 12 is thereafter bent into the form of a helix, as by wrapping around a suitable mandrel, so as to provide a generally tubular foraminous structure 16 to the outside of which is affixed the resilient material 14. The helical foraminous structure 16 will usually be formed with a "free state" wherein the resilient material 14 has an interference fit with an outer tube 18 and is inserted into the tubular member 18 with a twisting motion which tends to tighten and reduce the diameter of the coils of the helical structure 16. Insertion of the helical structure 16 into the tubular member 18 is facilitated by this twisting motion, and after complete insertion into the tubular member 18, the twisting motion is stopped to allow the helical structure 16 to expand and force the resilient material 14 into tight engagement with the inside surface 20 of an internal chamber 22 of the tubular member 18. The coils of the helical structure 16 will be spaced apart in some areas and will touch at spaced apart locations, particularly inside of bends in the tubular member 18, to provide a plurality of generally helical foramina or openings through the helical structure 16.

In some instances, the helical structure 16, with the strip of resilient material 14 affixed thereto, can be inserted into bent portions of the tubular members 18, but in the preferred embodiment shown in FIGS. 1–6, the helical structure 16 is preferably inserted into a straight section of the tubular member 18, and thereafter the assembly is bent into a configuration which corresponds to the exhaust and tail pipe of an automotive vehicle. Bending of the assembly can be accomplished without damage to the helical structure 16. In fact, usually there will be a slight reduction in diameter of the tubular member 18 which will cause the resilient material 14 to be gripped more firmly by the tubular member 18 so as to provide better anchorage of the helical structure 16 in place within the tubular member 18.

The helical structure 16 is preferably wound in a manner providing a slight air space between each coil of the helix which in most instances will be between one-eighth and one-fourth inch. These air spaces between the coils of the helix cause the exhaust gases to communicate with the annular region between the helical structure 16 and the tubular member 18, and the resilient strip material 14 breaks this annular area into what amounts to a plurality of air cushioned compartments which muffle the sound of the exhaust gases. The structure of the present invention will usually extend from the internal combustion engine to the region of discharge for the exhaust gases, so that a considerable length of muffling structure is provided; and in addition it will be seen that this muffling structure includes the bent portions of the tubular member 18. A definite advantage exists in having the helical structure 16 extend continuously through the bent portions of the tubular member 18, inasmuch as it causes the exhaust gases and sound waves to be directed through the air gaps between the coils of the helical structure and into the air cushioned compartments between the helical structure 16 and tubular member 18. A greater degree of muffling of the sound is therefore provided by the structure of the present invention than by structures wherein the muffling regions are confined to straight sections of the exhaust conduits. While in most instances it will be easier to insert the helical structure 16 with the strip of resilient material 14 thereon into a straight section of the tubular member 18 and thereafter bend the entire assembly to the desired configuration, there will be other instances where it is easier and more desirable to bend the tubular member 18 to the desired curvatures and thereafter to insert the helical structure 16 into the bent tubular member 18. This is a particular advantage when the finished configuration of the outer tube requires difficult or severe bends and other operations which may result in collapse or breakage, requiring scrapping of the part. If the outer tube, after fabricating, does not conform to specifications, only this part is lost and not the entire assembly.

Figure 5:
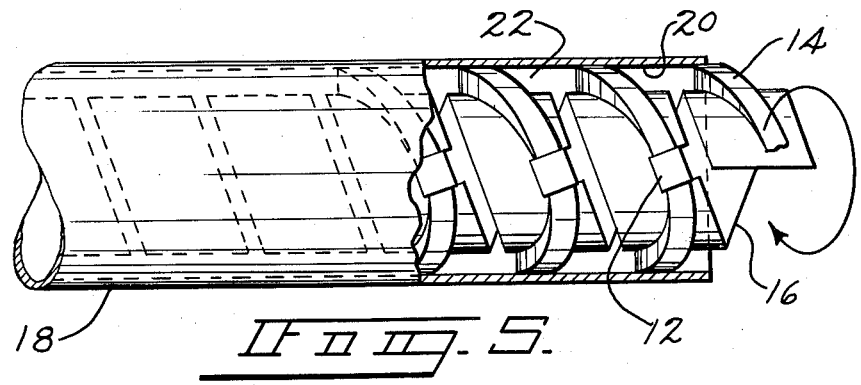
FIG. 5 shows a portion of the metal tube with the helix installed therein and expanded against its inner walls after twisting force has been released allowing the diameter of the helix to enlarge.
Figure 6:
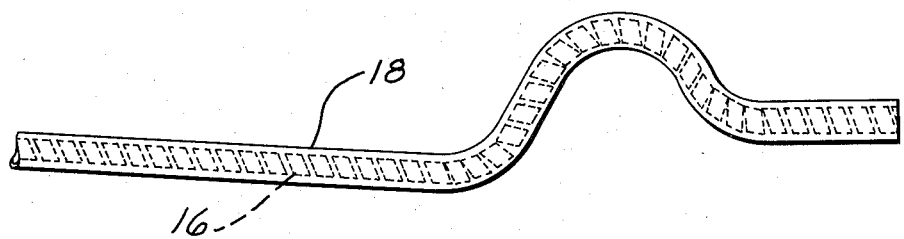
FIG. 6 shows the structure of FIG. 5 bent into a configuration corresponding to that of the exhaust and tail pipe of an automotive vehicle.
Figure 7:
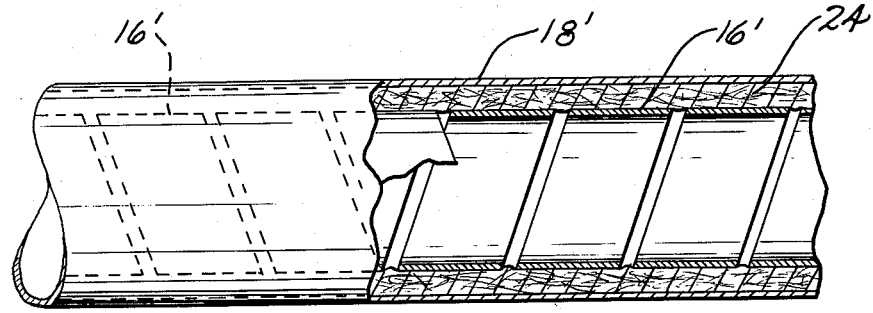
FIG. 7 is a view similar to that of FIG. 5 but showing another embodiment of the invention.

The embodiment shown in FIG. 7 is generally similar to that previously described and differs principally therefrom in that the internal structure does not have a strip of resilient material attached thereto. Those portions of the embodiment shown in FIG. 7 which correspond to like portions of the embodiment shown in FIGS. 1–6 are designated by like reference numerals characterized further in that a prime mark is affixed thereto. The helical structure 16′ does not include tabs but is separated from the inner walls of the tubular member 18′ by means of a temperature resistant sound absorbent material 24, such as fiberglass, packed between the outside of the helical structure 16′ and the inner walls of the tubular member 18′. The continuous wrapping of fiberglass 24, instead of providing unoccupied sound absorbing compartments as in the previous embodiment, provides a generally continuous layer of sound deadening material which absorbs, and at the same time spaces the helical structure 16′ from the tubular member 18′.

Figure 8:
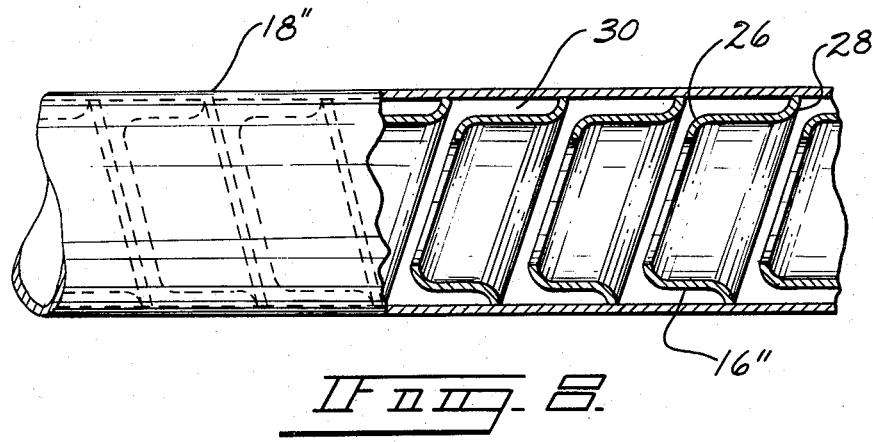
FIG. 8 is a view similar to FIG. 5 but showing still another embodiment of the invention.

The embodiment shown in FIG. 8 is also somewhat similar to the embodiment shown in FIGS. 1–6 and differs therefrom principally in that the inner member is not spaced from the sidewalls of the outer tubular member by means of a resilient material, but is spaced therefrom by means of projections on the inner member. Those portions of the embodiments shown in FIG. 8 which correspond with like portions of the embodiment shown in FIGS. 1–6 are designated by like reference numerals characterized further in that a double prime mark is affixed thereto. The inner member 16″ of the embodiment shown in FIG. 8 is also shown as being formed by helically winding a piece of strip material into a generally tubular structure that includes an air space between the adjacent coils which form the inner member. Before the strip 16″ is helically wound into a generally tubular shape, the front or leading edge of the strip 16″ is bent downwardly as at 26 while the trailing edge is bent upwardly as at 28. When the strip 16″ is helically wound into a generally tubular shape and inserted into the outer member 18″, the upwardly bent portions 28 contact the inner wall of the outer tubular member 18″ to support the inner generally tubular structure in spaced relationship therewith and to provide air pockets 30 between the inner member 16″ and the outer member 18″. The inwardly bent portions serve the function of diverting gases and sound into the pockets 30 to thereby muffle the sound issuing with the exhaust gases from an internal combustion engine. As in the previous embodiments, the inner generally tubular member 16″ extends continuously through the bent portions of the outer tubular member 18″ to materially attenuate rather than reflect sound around the curved portions of the outer tubular member.

FIGS. 9 and 10 of the drawings show still another embodiment of the invention. In this embodiment an inner liner 32 is of somewhat smaller diameter than the internal chamber of an outer tube 34, and is spaced from the outer tube by inwardly directed deformations 36 of the outer tube 34. The deformations 36 extend circumferentially around the outer tubular member 34 at longitudinally spaced intervals to provide sound deadening compartments 38 therebetween. When it is desirable to create sound deadening compartments of relatively greater length, then deformations 36 would be located farther apart. In order to substantially support the inner liner at proper intervals between deformations 36, deformations such as 40 may be employed. These do not extend circumferentially around the outer tube but only consist of two diametrically opposed arc sections, each contacting the inner liner on about one-fourth of the circumference. With this arrangement any number of support points can be located between deformations 36 without closing off the effective length of compartment 38. By way of example, sounds of certain wave lengths can be most effectively attenuated by compartments 38 which are approximately 30 inches long. In those circumstances where the flexible foraminous inner liner 32 is made from a helically wound strip having helical foramina between its coils, the liner 32 would be so flexible as to vibrate between the sides of the outer tube 34 if it were not supported at more frequent intervals. By providing the partial deformations 40 at approximately 6" spacings, the flexible foraminous inner liner 32 is adequately supported without reducing the effective length of the sound deadening compartments 38. In some instances it may be desirable to round or otherwise form the edges of the strip before forming the helical shape. This would preclude the possibility of sound being created by the rapidly moving gases over relatively thin edges of the metal strip. The structure shown in FIGS. 9 and 10 is preferably assembled by providing the outer tubular member 34 with the necessary bends, and thereafter inserting the inner liner 32 into the outer member 34. After the inner liner 32 is installed within the length of outer tubular member 34, including its bent portions, the outer tubular member 34 is deformed inwardly as at 36 and 40 at the proper spaced apart intervals so as to support the inner member 32 generally centrally of the outer tubular member 34 and provide the sound deadening compartments 38. As in the previous embodiments, the inner liner 32 extends through the bent portions of the outer tubular member 34 so that sound attenuation occurs throughout the entire length of the exhaust pipe.

While the various embodiments shown in the drawing comprise an inner liner that is made of a spirally wound strip of sheet material, it is not intended that the invention shall be limited thereto so long as the inner liner is flexible and extends through the bent portions of the outer tubular conduit so as to attenuate sound from the gases going through the bent portions of the tube, rather than to have the gases pass through these bent portions, which frequently account for up to 50% of the total length of the conduit, without the benefit of attenuation. In structures wherein a tubular inner liner is confined to the straight sections of an exhaust conduit, sound is free to pass in a straight line through the central opening of the liner to impinge upon the hard surfaces of the unlined bent portions of the outer tube, to be reflected from side to side in passing through the bent portions of the outer tube, and finally to pass in a straight line through the central opening of a second tubular liner.

Although the invention has been described as having particular advantages when used in the exhaust system of an automotive vehicle, it may be used to reduce sound in the intake systems for internal combustion engines, or for other applications where gases must be conveyed and silenced.

While the invention has been described in considerable detail, it is not to be limited to the particular embodiments shown and described, and it is intended to cover hereby all novel adaptations, modifications, and arrangements thereof which come within the practice of those skilled in the art to which the invention relates.

What I claim is:

1. A conduit for conveying and attenuating the noise level in gases comprising: a rigid imperforate tubular member having a generally uniform outside diameter and an internal passage of generally uniform cross section throughout its length with at least one bend therein, a flexible helically wound strip of metal having a width considerably greater than its thickness positioned in said internal passage of said rigid tubular member with the width of the strip of metal forming successive coils extending parallel to the sidewalls of said rigid tubular member, said helically wound strip being spaced radially inwardly from the wall of said rigid tubular member to provide an annular space of appreciable volume therebetween, and means supporting said helically wound strip from the sidewalls of said rigid tubular member without materially reducing the volume of air capable of being contained in said annular space, said means restricting axial flow of gases through said annular space, and said coils of said helically wound strip being spaced apart sufficiently to provide communication for gas flow between said internal passage of said helically wound strip and said annular space and being sufficiently close together to produce a throttling effect for said gas flow.

2. The conduit of claim 1 wherein said means for supporting said helically wound strip from the sidewalls of said rigid tubular member and for restricting axial flow of gases through said annular space is a porous mass of interconnected fibers the volume of which does not appreciably reduce the volume of air capable of being contained in said annular space.

3. The conduit of claim 1 wherein said means for supporting said helically wound strip in the sidewalls of said rigid tubular member and for restricting axial flow of gases through said annular space is a flexible helically wound strip of high temperature resistant resilient material interpositioned between said flexible helically wound strip of metal and said rigid tubular member.

4. The conduit of claim 3 wherein said strip of helically wound metal is slotted to form tabs and said tabs are bent over said strip of resilient high temperature resistant material to secure the material to the metal strip.

5. The conduit of claim 1 wherein said means for supporting said helically wound strip from the sidewalls of said rigid tubular member and for restricting axial flow of gases through said annular space comprise, generally circumferentially extending radially inwardly deformed portions of said generally rigid tubular member extending generally radially inwardly for abutment with said helically wound strip.

6. The conduit of claim 1 wherein the means for supporting said helically wound strip of metal from the sidewalls of said rigid tubular member and for restricting axial flow of gases through said annular space comprise, laterally outwardly turned edge portions of the coils of said helically wound strip of metal positioned to engage the sidewalls of said rigid tubular member.

7. The conduit of claim 6 wherein the opposite edge portions of the coils of said helically wound strip are turned generally radially inwardly.

References Cited by the Examiner

UNITED STATES PATENTS

| 956,906 | 5/1910 | Sizer | 181—44 |
|---|---|---|---|
| 1,577,775 | 3/1926 | Templeton | 181—36 |
| 1,891,290 | 12/1932 | Tessky. | |
| 2,014,368 | 9/1935 | Blundell | 181—36 |
| 2,034,119 | 3/1936 | Shebat | 181—40 |
| 2,073,951 | 3/1937 | Servais | 181—42 |
| 2,096,260 | 10/1937 | Pavillon | 181—36 |

(Other references on following page)

| | | UNITED STATES PATENTS | | | | FOREIGN PATENTS | |
|---|---|---|---|---|---|---|---|
| 2,217,090 | 10/1940 | Zerbe | 29—455 | 526,045 | 2/1954 | Belgium. |
| 2,247,130 | 6/1941 | McCurdy | 181—36 | 467,811 | 11/1928 | Germany. |
| 2,274,599 | 2/1942 | Freeman | 181—47 | 223,327 | 10/1924 | Great Britain. |
| 2,548,965 | 4/1951 | Gaugler | 181—47 | 547,434 | 8/1942 | Great Britain. |
| 2,805,730 | 9/1957 | Applegate | 181—42 | 563,110 | 7/1944 | Great Britain. |
| 2,839,825 | 6/1958 | Edwards et al. | 29—455 | 679,940 | 9/1952 | Great Britain. |
| 3,104,732 | 9/1963 | Ludlow et al. | 181—36 | 265,468 | 6/1929 | Italy. |
| 3,104,734 | 9/1963 | Ludlow et al. | 181—36 | | | |
| 3,104,735 | 9/1963 | Ludlow et al. | 181—36 | | | |

LEO SMILOW, *Primary Examiner.*